(12) United States Patent
Ishii

(10) Patent No.: US 11,310,377 B2
(45) Date of Patent: Apr. 19, 2022

(54) INFORMATION PROCESSING TERMINAL AND INFORMATION PROCESSING SYSTEM

(71) Applicant: Nanami Ishii, Kanagawa (JP)

(72) Inventor: Nanami Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 239 days.

(21) Appl. No.: 16/718,415

(22) Filed: Dec. 18, 2019

(65) Prior Publication Data

US 2020/0220990 A1 Jul. 9, 2020

(30) Foreign Application Priority Data

Jan. 4, 2019 (JP) .............................. JP2019-000224

(51) Int. Cl.
*H04N 1/00* (2006.01)

(52) U.S. Cl.
CPC ..... *H04N 1/00435* (2013.01); *H04N 1/00395* (2013.01); *H04N 1/00424* (2013.01); *H04N 1/00437* (2013.01); *H04N 2201/0094* (2013.01)

(58) Field of Classification Search
CPC ........... H04N 1/00395; H04N 1/00413; H04N 1/00416; H04N 1/00424; H04N 1/00435; H04N 1/00437; H04N 2201/0094; G06F 3/1204

USPC ......................................................... 358/1.15
See application file for complete search history.

(56) References Cited

U.S. PATENT DOCUMENTS

| | | | | |
|---|---|---|---|---|
| 2005/0108638 | A1* | 5/2005 | Kitajima | H04N 1/00435 715/273 |
| 2008/0307355 | A1* | 12/2008 | Yokota | G06F 3/0488 715/808 |
| 2010/0218143 | A1* | 8/2010 | Kawashima | H04N 1/00411 715/854 |
| 2018/0013913 | A1 | 1/2018 | Hayashi et al. | |

FOREIGN PATENT DOCUMENTS

JP 2018-014079 1/2018

\* cited by examiner

*Primary Examiner* — Kent Yip
(74) *Attorney, Agent, or Firm* — IPUSA, PLLC

(57) ABSTRACT

An information processing terminal and an information processing system. The information processing terminal displays on a display, a plurality of screens in a sequential order, one or more of the plurality of screens being configured to receive a user operation, displays on the display, a symbol indicating degree of progress of the user operation on the plurality of screens, and at least one object for receiving a screen transition request that requests transition from one screen to another screen of the plurality of screens in the sequential order, and changes appearance of the symbol indicating the degree of progress of the user operation in response to the transition request.

10 Claims, 17 Drawing Sheets

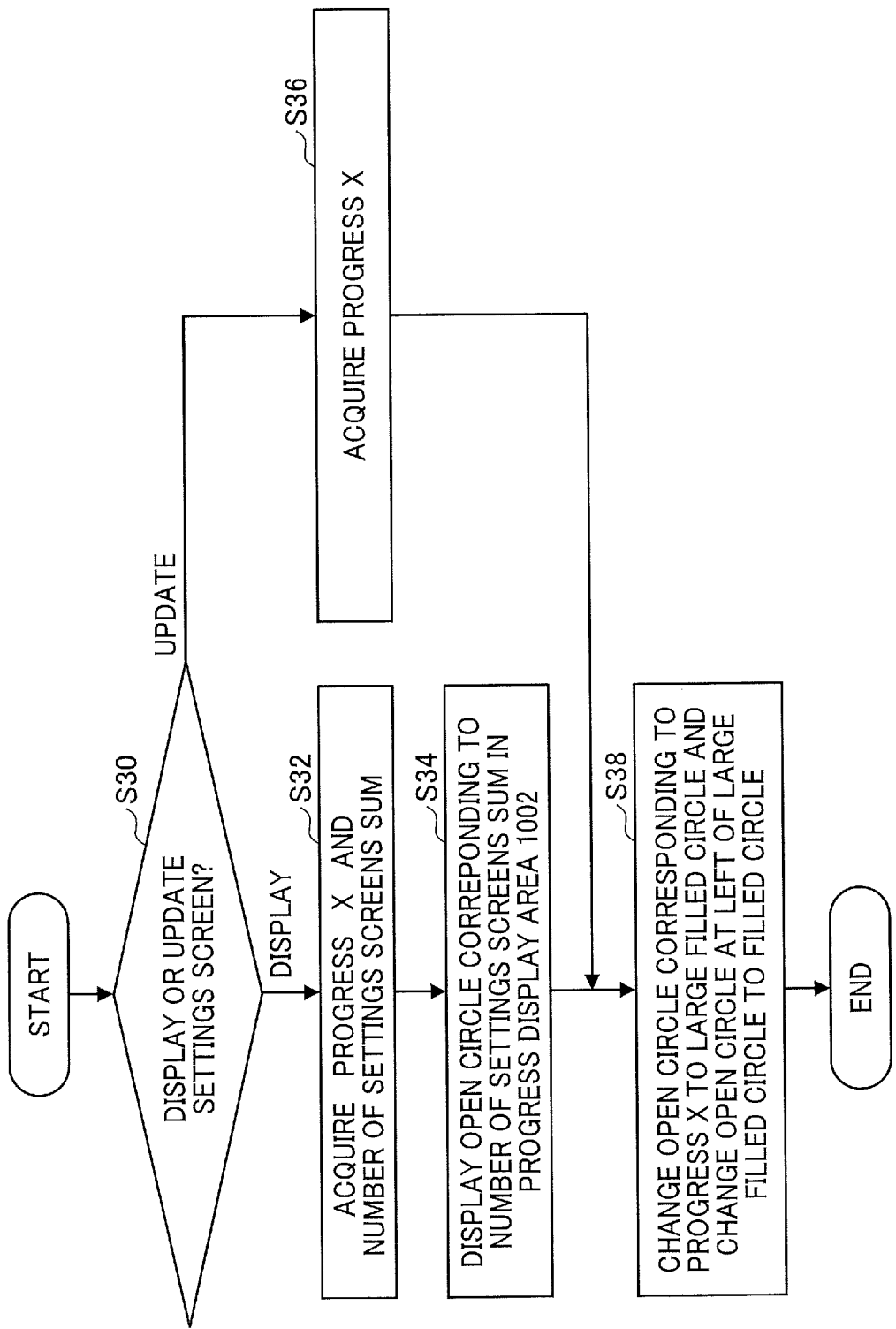

INFORMATION PROCESSING TERMINAL AND INFORMATION PROCESSING SYSTEM

CROSS-REFERENCE TO RELATED APPLICATIONS

This patent application is based on and claims priority pursuant to 35 U.S.C. § 119(a) to Japanese Patent Application No. 2019-000224, filed on Jan. 4, 2019 in the Japan Patent Office, the entire disclosure of which is hereby incorporated by reference herein.

BACKGROUND

Technical Field

The present disclosure relates to an information processing terminal and an information processing system.

Background Art

For example, the multifunction peripheral (MFP) accepts a setting operation from the user from a plurality of settings screens. In such an MFP, the user has performed a setting operation while transitioning a plurality of settings screens. For example, as a progress management system for a web application developed based on a screen transition diagram, a progress management system that graphically displays a progress status corresponding to the screen transition diagram has been known.

SUMMARY

Embodiments of the present disclosure describe an information processing terminal and an information processing system. The information processing terminal displays on a display, a plurality of screens in a sequential order, one or more of the plurality of screens being configured to receive a user operation, displays on the display, a symbol indicating degree of progress of the user operation on the plurality of screens, and at least one object for receiving a screen transition request that requests transition from one screen to another screen of the plurality of screens in the sequential order, and changes appearance of the symbol indicating the degree of progress of the user operation in response to the transition request.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 8B is a diagram illustrating a flowchart of an example of a process of displaying a progress display area according to embodiments of the present disclosure;

Figure 1:
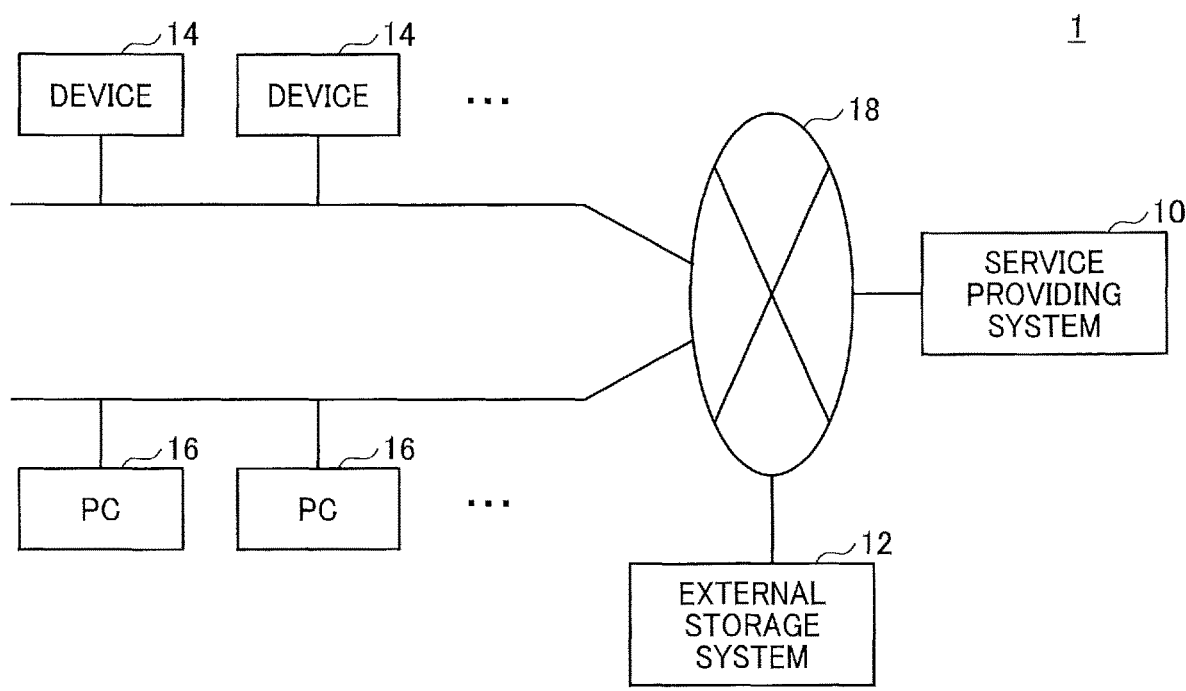
FIG. 1 is a schematic diagram illustrating an example of a configuration of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Embodiments of the present disclosure are described in detail below, with reference to the drawings.

A system configuration of an information processing system 1 according to the present embodiment is described with reference to FIG. 1. FIG. 1 is a schematic diagram illustrating an example of a configuration of an information processing system according to the present embodiment. The information processing system 1 illustrated in FIG. 1 includes a service providing system 10, an external storage system 12, at least one device 14, and a personal computer (PC) 16, communicably connected through a network 18 such as the internet or a local area network (LAN).

The service providing system 10 is implemented by at least one information processing apparatus and provides various services through the network 18. Examples of services provided by the service providing system 10 according to the present embodiment are described below.

The external storage system 12 is implemented by at least one information processing apparatus and provides an online storage service through the network 18. The external storage system 12 provides a storage area. In the present embodiment, the storage area provided by the external storage system 12 is managed as a folder or an electronic file.

The device 14 is an example of an information processing terminal operated by a user. For example, the device 14 is an image forming apparatus. The image forming apparatus is an MFP, a printer, a scanner, or a facsimile.

The device 14 is not limited to an image forming apparatus as long as the device has a communication function. The device 14 includes, for example, an output device such as a projector (PJ), an interactive white board (an electronic white board with mutual communication capability (IWB)), a digital signage, a heads up display (HUD), and an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC or a desktop PC.

The PC 16 is an example of an information processing terminal operated by a user. The PC 16 is, for example, the notebook PC, the desktop PC, the wearable PC, the mobile phone, the smartphone, the tablet terminal, the game console, the PDA, or the like. The user can use various services provided by the service providing system 10 by operating the device 14 and the PC 16.

The configuration of the information processing system 1 illustrated in FIG. 1 is an example. For example, the service providing system 10 may use a folder or a file other than the external storage system 12. The service providing system 10 may be implemented by a plurality of computer systems.

Figure 2:
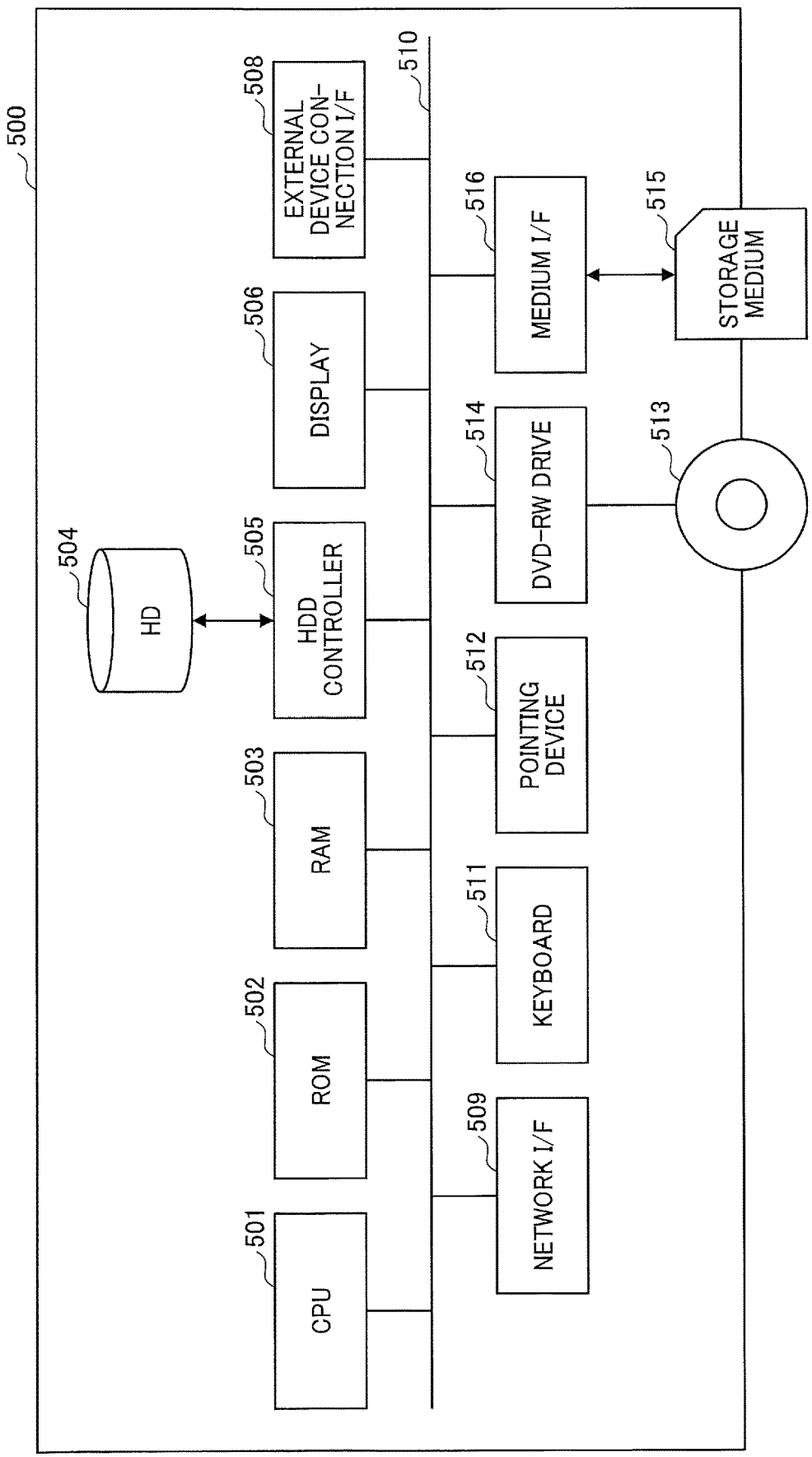
FIG. 2 is a block diagram illustrating an example of a hardware configuration of a computer, according to embodiments of the present disclosure.

The service providing system 10, the external storage system 12, and the PC 16 are each implemented by, for example, a computer 500 having a hardware configuration illustrated in FIG. 2. The device 14, which may be a PC, can also implemented by a computer 500 having a hardware configuration illustrated in FIG. 2, for example.

FIG. 2 is a block diagram illustrating an example of hardware configuration of the computer 500, according to the present embodiment. As illustrated in FIG. 2, the computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disc-rewritable (DVD-RW) drive 514, and a medium I/F 516.

Among these elements, the CPU 501 controls entire operation of the computer 500. The ROM 502 stores a control program such as an initial program loader (IPL) to boot the CPU 501. The RAM 503 is used as a work area for the CPU 501. The HD 504 stores various data such as a control program. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a universal serial bus (USB) memory or a printer. The network I/F 509 is an interface for performing data communication using the network 18. The data bus 510 is an address bus, a data bus, or the like for electrically connecting each element such as the CPU 501.

The keyboard 511 is an example of input device provided with a plurality of keys for allowing a user to input characters, numerals, or various instructions. The pointing device 512 is an example of an input device that allows a user to select a specific instruction or execution, select a target for processing, or move a cursor being displayed. The DVD-RW drive 514 reads and writes various data from and to the DVD-RW 513, which is an example of a removable storage medium. The removable storage medium is not limited to the DVD-RW and may be a digital versatile disc-recordable (DVD-R) or the like. The medium I/F 516 controls reading and writing (storing) of data to and from the storage medium 515 such as a flash memory.

Figure 3:
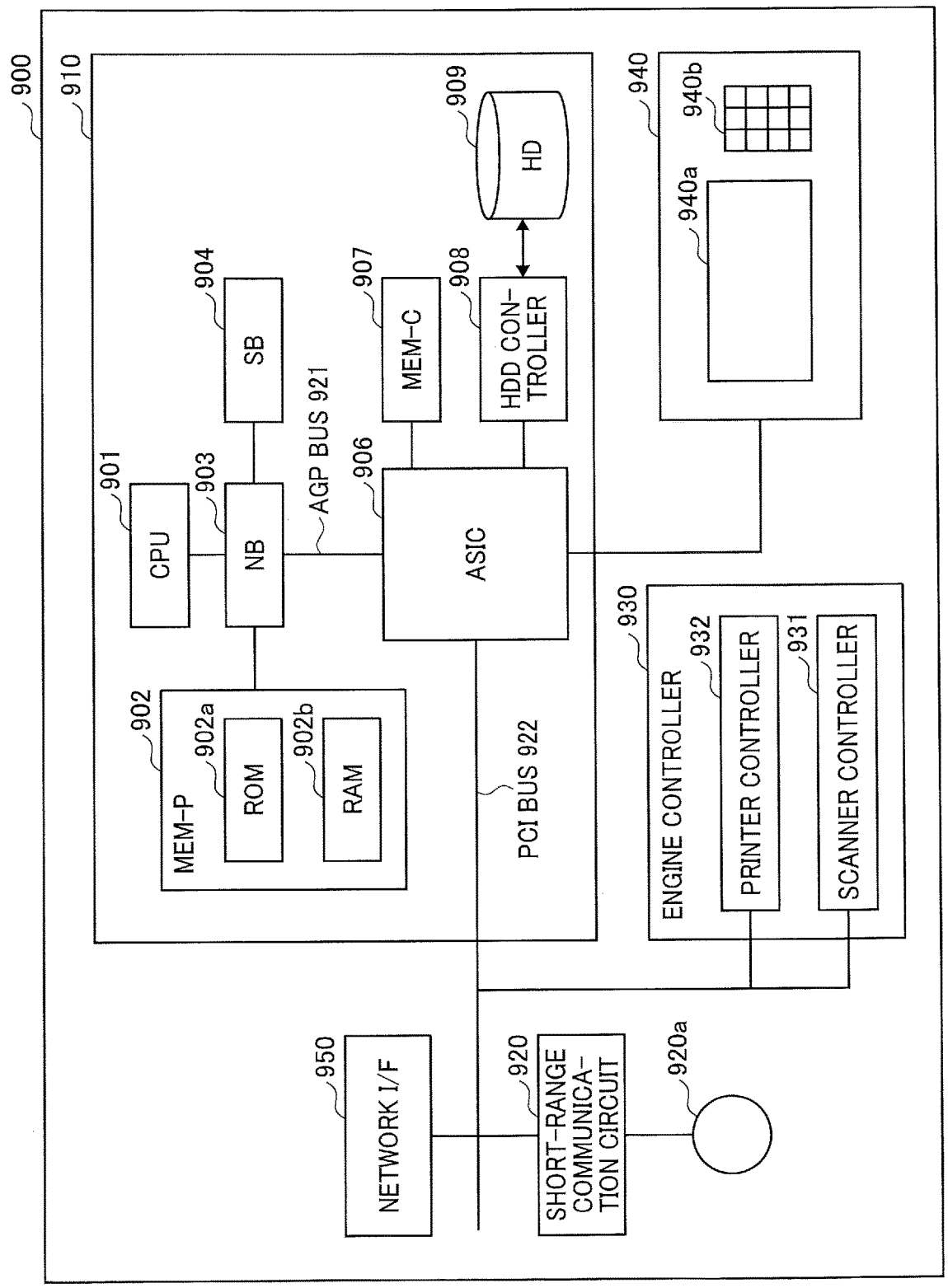
FIG. 3 is a block diagram illustrating an example of a hardware configuration of an MFP according to embodiments of the present disclosure.

When the device 14 included in the information processing system 1 is an MFP, the device 14 has a hardware configuration as illustrated in FIG. 3, for example. FIG. 3 is a block diagram illustrating an example of a hardware configuration of an MFP 900 according to the present embodiment. As illustrated in FIG. 3, the MFP 900 includes a controller 910, a short-range communication circuit 920, an engine controller 930, an operation panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

Among these elements, the CPU 901 is a processor that performs overall control of the MFP 900. The NB 903 connects the CPU 901 with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for implementing various functions of the controller 910. The MEM-P 902 further includes a RAM 902b as a memory that deploys the program and data, or as a rendering memory that stores rendering data for printing. The program stored in the RAM 902b may be stored in any computer-readable storage medium, such as a compact disc-read only memory (CD-ROM), compact disc-recordable (CD-R), or digital versatile disc (DVD), in a file format installable or executable by the computer, for distribution.

The SB 904 connects the NB 903 with a peripheral component interconnect (PCI) device or a peripheral device. The ASIC 906 is an integrated circuit (IC) dedicated to image processing, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner controller 931 and a printer controller 932 through the PCI bus 922. The ASIC 906 may be connected to a USB interface, or the Institute of Electrical and Electronics Engineers 1394 (IEEE1394) interface.

The MEM-C 907 is a local memory used as a buffer for image data to be copied or code image. The HD 909 is a storage for storing image data, font data used for printing, and forms. The HDD controller 908 reads or writes various data from or to the HD 909 under control of the CPU 901. The AGP bus 921 is a bus interface for a graphics accelerator card, for high-speed graphics processing. Through directly accessing the MEM-P 902 by high-throughput, processing of the graphics accelerator card is accelerated.

The short-range communication circuit 920 is connected with a short-range communication antenna 920*a*. The short-range communication circuit 920 is a communication circuit that communicates in compliance with the near field communication (NFC), the Bluetooth (registered trademark) and the like.

The engine controller 930 includes the scanner controller 931 and the printer controller 932. The operation panel 940 displays a settings screen, a selection screen, a start key for receiving a copy start instruction, and the like. The operation panel 940 includes a panel display unit 940*a* such as a touch panel that receives input from the operator, and an operation panel 940*b* that includes a numeric keypad that receives setting values of image forming conditions such as density setting conditions. The controller 910 controls entire operation of the MFP 900. In example operation, the controller 910 controls rendering, communication, or user inputs to the operation panel 940. The scanner controller 931 and the printer controller 932 each performs various image processing, such as error diffusion or gamma conversion.

In response to an instruction to select a specific application through the operation panel 940, for example, using a mode switch key, the MFP 900 selectively performs a document box function, a copy function, a print function, and a facsimile function. When the document box function is selected, the MFP 900 operates in a document box mode to store document data. With selection of the copy function, the MFP 900 operates in a copy mode. With selection of the print function, the MFP 900 operates in a print mode. With selection of the facsimile function, the MFP 900 operates in a facsimile mode.

The network I/F 950 is an interface for performing data communication using the network 18. The short-range communication circuit 920 and the network I/F 950 are electrically connected to the ASIC 906 through the PCI bus 922.

Figure 4:
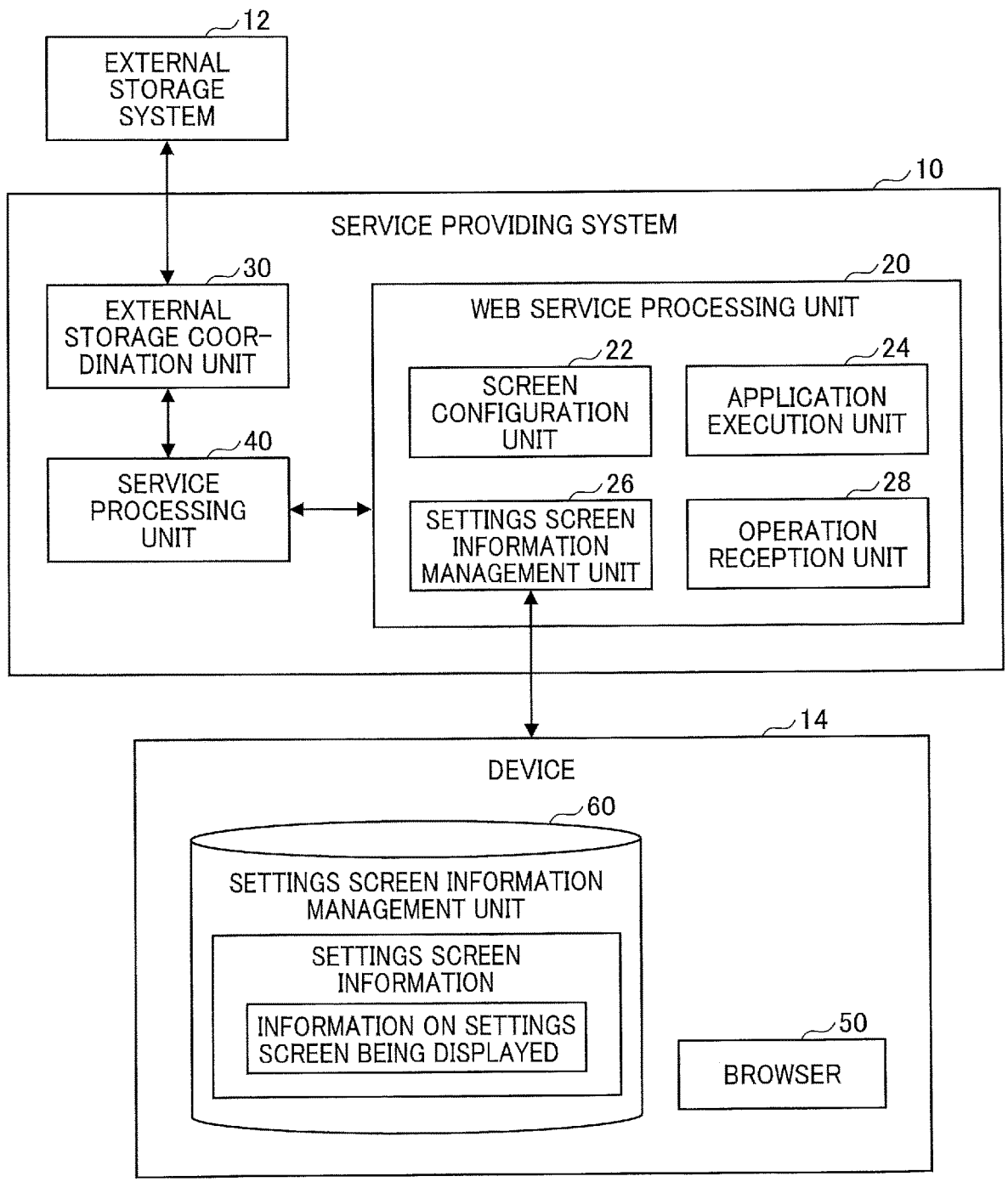
FIG. 4 is a block diagram illustrating an example of a functional configuration of the information processing system according to embodiments of the present disclosure.

FIG. 4 is a block diagram illustrating an example of a functional configuration of the information processing system 1 according to the present embodiment. The device 14 illustrated in FIG. 4 includes a browser 50. The user of the device 14 uses services provided by the service providing system 10 from the browser 50 to display a settings screen described below. In addition, the device 14 includes a settings screen information management unit 60. The settings screen information management unit 60 holds various types of information such as settings screen sequence information and progress information, which are described below. In addition, various settings screen information includes information on settings screen being displayed. The information on settings screen being displayed is information on the currently displayed settings screen.

Note that the information processing system 1 illustrated in FIG. 4 is an example in which a web application is used, but a native application having a function equivalent to that of a web service processing unit 20 may be used.

The service providing system 10 of FIG. 4 includes the web service processing unit 20, an external storage coordination unit 30, and a service processing unit 40. The external storage coordination unit 30 and the service processing unit 40 are implemented by processing executed by the CPU 501 according to at least one program installed in the service providing system 10. Further, the web service processing unit 20 is implemented by processing executed by the CPU 901 according to a code downloaded by the browser 50 of the device 14 in a format such as JavaScript (registered trademark) or cascading style sheets (CSS) and causes the CPU 901 to execute.

The web service processing unit 20 performs processing to allow the user to use various services of the service providing system 10 using the browser 50 of the device 14 or the browser of the PC 16. Hereinafter, an example in which the user uses various services of the service providing system 10 using the browser 50 of the device 14 is described.

The web service processing unit 20 includes a screen configuration unit 22, an application execution unit 24, a settings screen information management unit 26, and an operation reception unit 28. The screen configuration unit 22 configures (generates screen data) a settings screen to be displayed on the browser 50 of the device 14. Accordingly, a screen for using the service provided by the service providing system 10 is displayed on the browser 50 of the device 14. In response to a request from the browser 50 of the device 14, the application execution unit 24 transmits execution requests for various services to the service processing unit 40.

The settings screen information management unit 26 manages various settings screen information held by the settings screen information management unit 60 and reflects the user's setting operation on the settings screen to the various settings screen information. The operation reception unit 28 receives various operations from the user such as a user setting operation on the settings screen. The external storage coordination unit 30 makes various requests to the external storage system 12 such as a request for file list, a file download request, and a file upload request. The service processing unit 40 performs processing related to services provided by the service providing system 10. Note that the web service processing unit 20, the external storage coordination unit 30, the service processing unit 40, and the like may be implemented by different computers 500 respectively.

Figure 5:
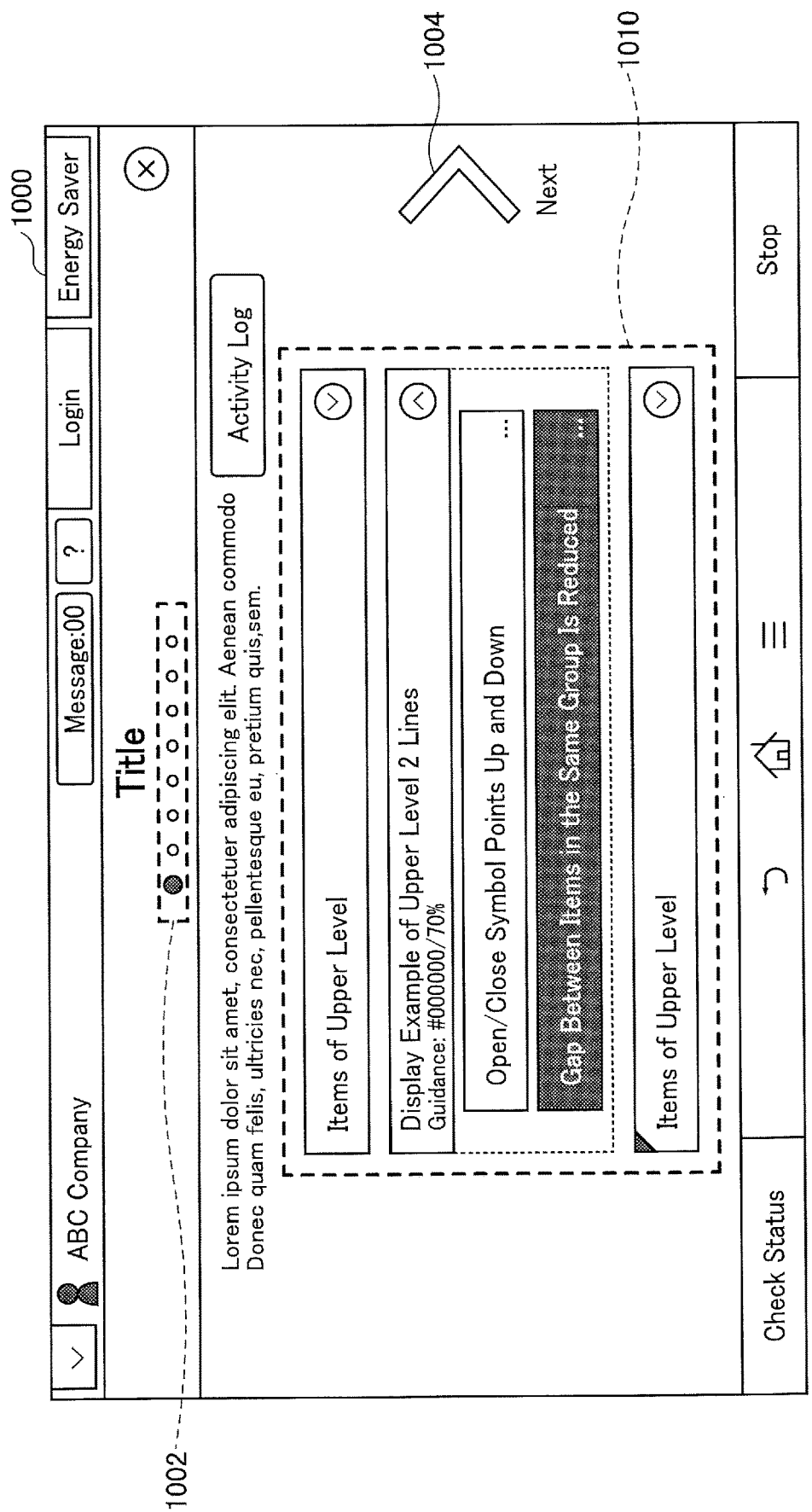
FIG. 5 is a diagram illustrating an example of a settings screen according to embodiments of the present disclosure.
Figure 6:
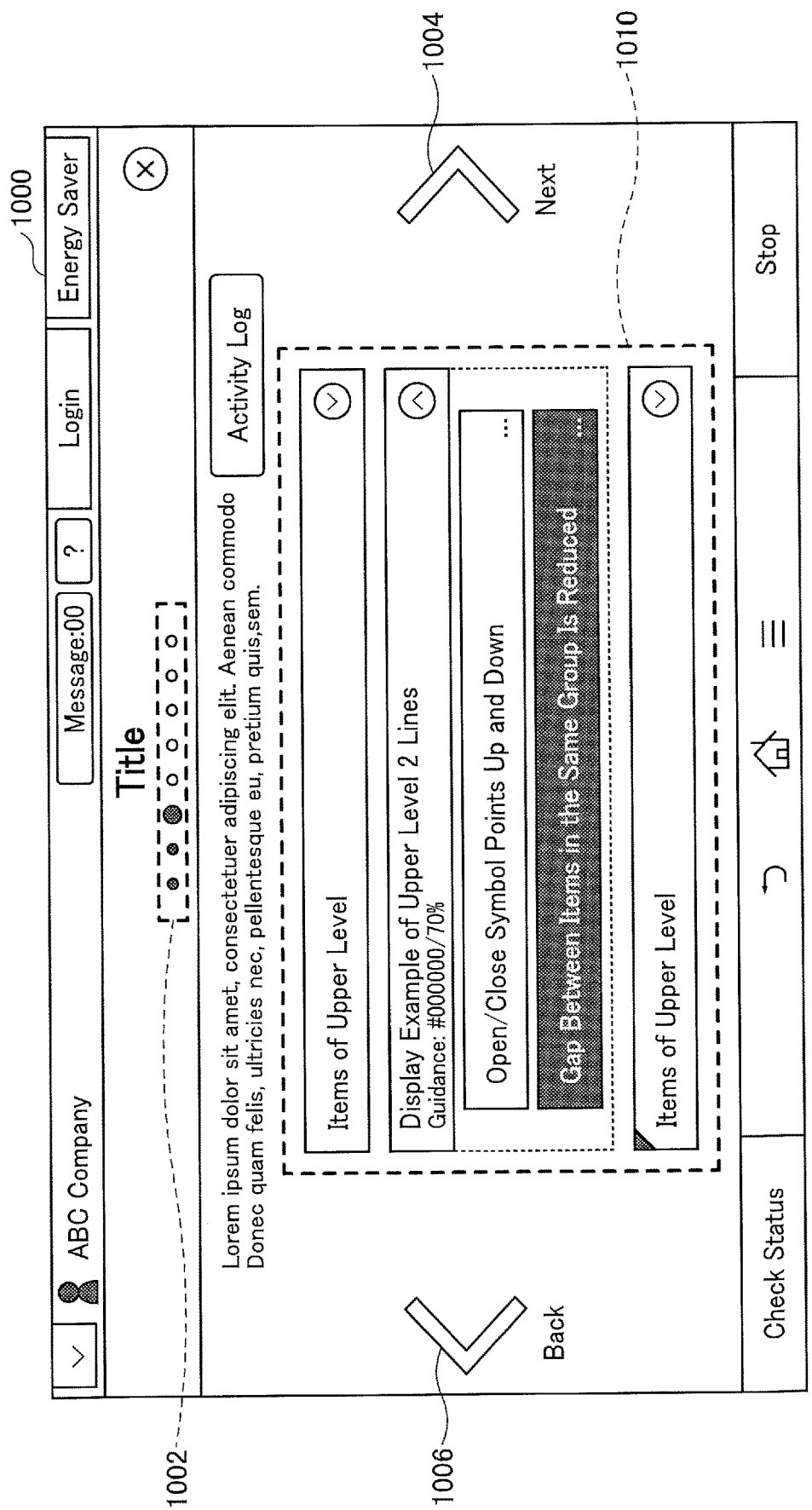
FIG. 6 is a diagram illustrating an example of a settings screen according to embodiments of the present disclosure.
Figure 7:
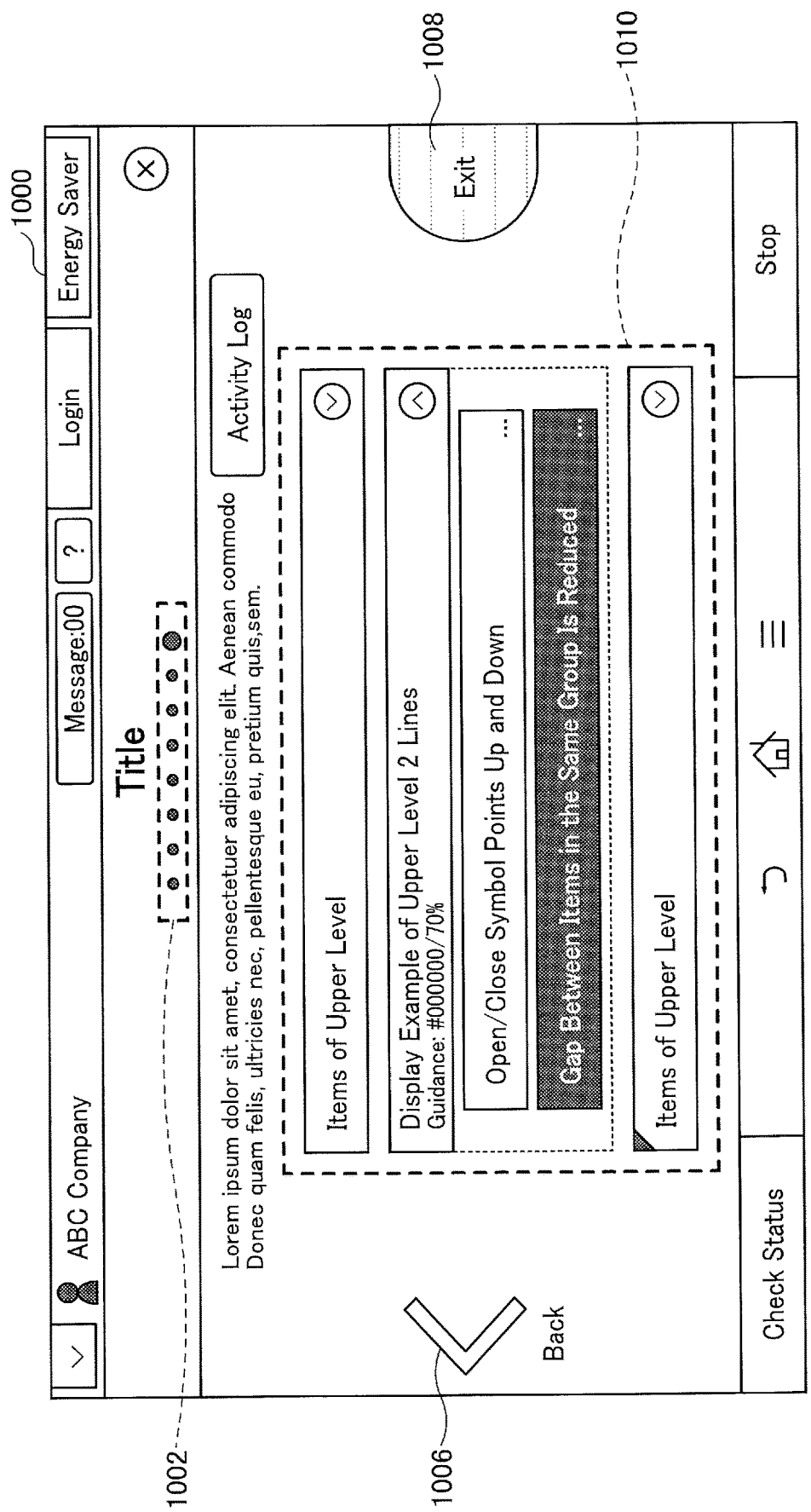
FIG. 7 is a diagram illustrating an example of a settings screen according to embodiments of the present disclosure.

The screen configuration unit 22 configures a settings screen 1000 as illustrated in FIGS. 5 to 7. FIGS. 5 to 7 are diagrams illustrating examples of the settings screen 1000 according to the present embodiment. The settings screen 1000 illustrated in FIGS. 5 to 7 is a wizard type user interface (UI). When a transition request for transitioning the settings screen 1000 is received from the user, a screen transition is carried out according to a sequential order. The settings screen 1000 is displayed on the panel display unit 940*a* of the device 14 by the browser 50.

The settings screen 1000 is configured to include various buttons such as a next button 1004, a back button 1006, and an end button 1008 for accepting a transition request operation in addition to the progress display area 1002 and the setting area 1010. The progress display area 1002 is an area representing the degree of progress of the user's setting operation on the plurality of settings screens 1000. The degree of progress indicates to which screen the setting operation is performed by a user when the user is performing setting operations using multiple settings screens. The progress display area 1002 displays the same number of open circles as the number of settings screens 1000 (number of pages) and changes the open circle to a filled circle when settings are completed on the settings screen 1000. Accordingly, the degree of progress of the user setting operation on the plurality of settings screens 1000 is displayed.

The progress display area 1002 changes the open circle corresponding to the currently displayed settings screen 1000 to a large filled circle to make the circle stand out, so that the user can easily grasp the degree of progress of the user's setting operation on the plurality of settings screens 1000. Further, to make the number of unset settings screens 1000 easier to grasp, the progress display area 1002 changes the open circle to the filled circle corresponding to the settings screen 1000 that has been set.

FIG. 5 is a diagram illustrating an example of the first page of the settings screen 1000. Accordingly, in the progress display area 1002, the first circle from the left corresponding to the first page of the settings screen 1000 is changed to a large filled circle. According to the settings screen 1000 of FIG. 5, the user can grasp at a glance that the first page among the total eight pages of the settings screen 1000 is displayed.

FIG. 6 is a diagram illustrating the third page of the settings screen 1000. In the progress display area 1002, the third circle from the left corresponding to the third page of the settings screen 1000 is changed to a large filled circle. FIG. 6 illustrates an example in which the first and second pages of the settings screen 1000 are already set. The first and second circles from the left corresponding to the first and second pages of the settings screen 1000 are changed to the filled circles. According to the settings screen 1000 illustrated in FIG. 6, the user can grasp at a glance that the third page of the total eight pages of the settings screen 1000 is displayed and that the first and second pages of the settings screen 1000 have been set.

FIG. 7 is a diagram illustrating the eighth page of the settings screen 1000. In the progress display area 1002, the eighth circle from the left corresponding to the eighth page of the settings screen 1000 has been changed to a large filled circle. FIG. 7 illustrates an example in which the first to seventh pages of the settings screen 1000 are already set. The first to seventh circles from the left corresponding to the first to seventh pages of the settings screen 1000 are changed to the filled circles. According to the settings screen 1000 illustrated in FIG. 7, the user can grasp at a glance that the eighth page of the total eight pages of the settings screen 1000 is displayed and that the first to eighth pages of the settings screen 1000 have been set.

In addition, the settings screen 1000 illustrated in FIG. 5 displays the next button 1004 for accepting a transition request operation from the user. When the user presses the next button 1004, the settings screen 1000 transitions to the next page in a sequential order. The settings screen 1000 illustrated in FIG. 6 displays the next button 1004 and the back button 1006 for accepting the transition request operation from the user. When the user presses the next button 1004, the settings screen 1000 transitions to the next page according to the series of sequence. When the user presses the back button 1006, the settings screen 1000 transitions to the previous page according to the series of sequence.

Further, the settings screen 1000 illustrated in FIG. 7 displays the back button 1006 and the exit button 1008 for accepting the transition request operation from the user. When the user presses the back button 1006, the settings screen 1000 transitions to the previous page according to the series of sequence. When the user presses the exit button 1008, the user's setting operation on the plurality of settings screens 1000 ends.

Figure 8A:
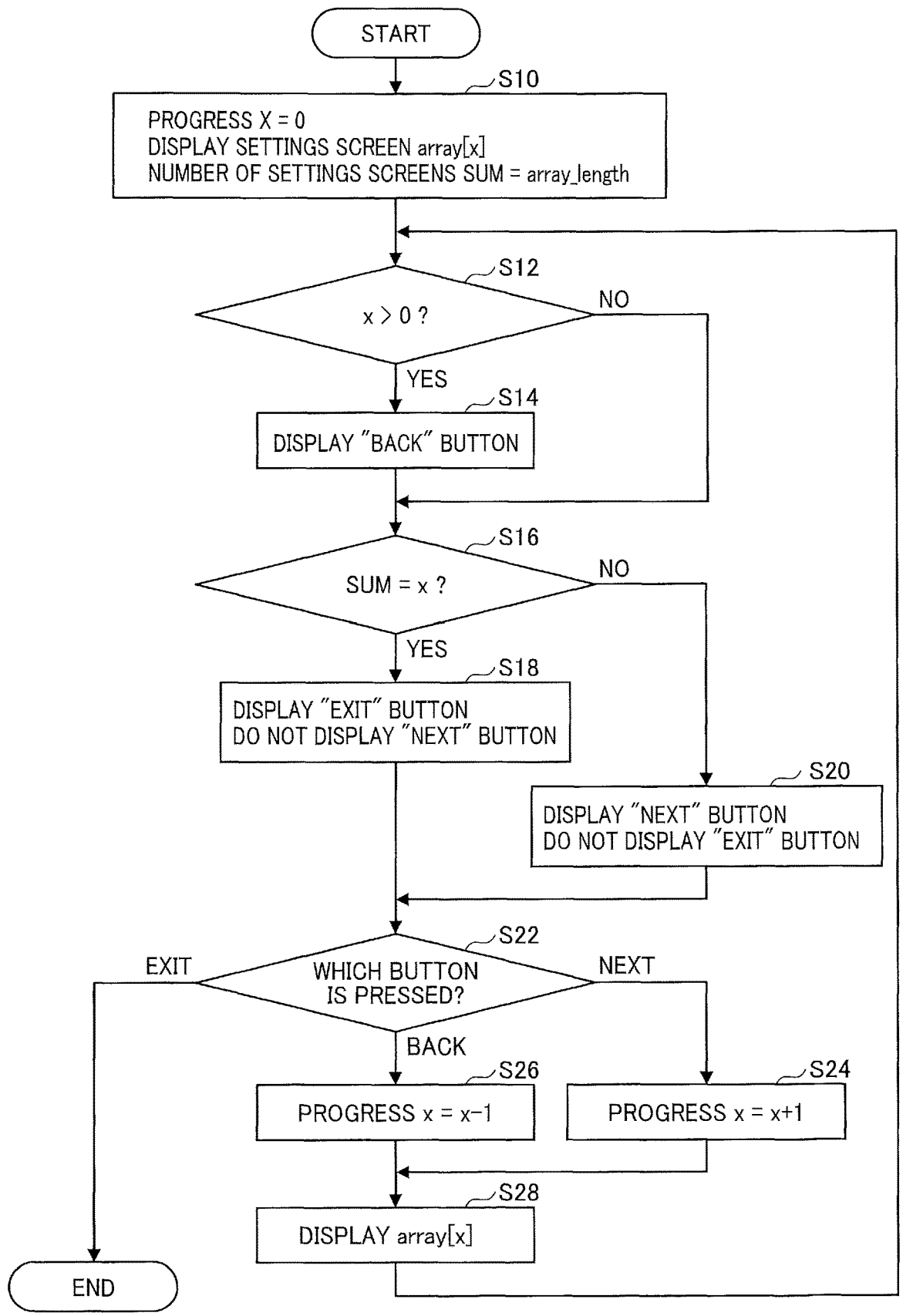
FIG. 8A is a diagram illustrating a flowchart of an example of a process of displaying the settings screen from start to end according to embodiments of the present disclosure.

Hereinafter, a process for transitioning the settings screen 1000 in the information processing system 1 according to the present embodiment is described. FIG. 8A is a flowchart of an example of a display process of the settings screen 1000 from the start to the end according to the present embodiment. The user performs an operation for displaying the settings screen 1000 on the panel display unit 940$a$ of the device 14.

When an operation for displaying the settings screen 1000 on the panel display unit 940$a$ of the device 14 is received from the user, the screen configuration unit 22 of the device 14 proceeds to step S10, and "0" indicating the first page is substituted into progress x indicating the page of the settings screen 1000 being displayed. Further, the screen configuration unit 22 substitutes the total number of pages of the settings screen 1000 for the number of settings screens SUM. In the example of the settings screen 1000 of FIGS. 5 to 7, "7" indicating the last page (eighth page) of the settings screen 1000 is substituted for the number of settings screens SUM.

In step S12, unless progress x>0, the screen configuration unit 22 skips step S14 for displaying the back button 1006 to display the first page of the settings screen 1000 illustrated in FIG. 5. On the other hand, if the progress x>0, the screen configuration unit 22 performs a process of step S14 for displaying the back button 1006 in order to display the second and subsequent pages of the settings screen 1000 illustrated in FIG. 6 or FIG. 7.

In step S16, the screen configuration unit 22 determines whether the number of settings screens SUM=progress x. The process of step S16 determines whether or not the progress x indicating the currently displayed settings screen 1000 is the same as the number of settings screens SUM indicating the page number of the last page of the settings screen 1000. In other words, whether the settings screen 1000 being displayed is the last page is determined.

If the number of settings screens SUM=progress x is not satisfied, the screen configuration unit 22 performs the process of step S20 for displaying the next button 1004 in order to display the settings screen 1000 illustrated in FIG. 6. If the number of settings screens SUM=progress x, the screen configuration unit 22 performs the process of step S18 for displaying the exit button 1008 in order to display the settings screen 1000 illustrated in FIG. 7.

In step S22, when the user presses the next button 1004, the screen configuration unit 22 proceeds to step S24, increases the progress x by 1, and after displaying the next page of settings screen 1000 in step S28, returns to step S12.

In step S22, when the user presses the back button 1006, the screen configuration unit 22 proceeds to step S26, decreases the progress x by 1, and after displaying the previous page of the settings screen 1000 in step S28, returns to step S12. In step S22, when the user presses the exit button 1008, the screen configuration unit 22 ends the process described in the flowchart illustrated in FIG. 8A.

According to the process described in the flowchart illustrated in FIG. 8A, the settings screen 1000 illustrated in FIG. 5 when the progress x=0, the settings screen 1000 illustrated in FIG. 6 when the progress x=2, and the settings screen 1000 illustrated in FIG. 7 when the progress x=7 can be switched and displayed.

In step S28, when displaying the settings screen 1000, the screen configuration unit 22 displays the progress display area 1002 according to the flowchart illustrated in FIG. 8B. FIG. 8B is a diagram illustrating the flowchart of an example of a display process of the progress display area 1002 according to the present embodiment.

In step S30, the screen configuration unit 22 determines whether the settings screen 1000 is to be displayed or to be updated. When the determination is to display the settings screen 1000, the screen configuration unit 22 acquires information on the progress x and the number of settings screens SUM from the settings screen information management unit 60 in step S32. In step S34, the screen configuration unit 22 displays the same number of open circles as the number of settings screens SUM in the progress display area 1002.

In step S38, the screen configuration unit 22 changes the open circle representing the displayed settings screen 1000 corresponding to the progress x to a large filled circle and changes the open circle on the left side of the large filled circle to the regular filled circle representing the settings screen 1000 that has been set.

On the other hand, when the determination in step S30 is to update the settings screen, the screen configuration unit 22 acquires the information of progress x from the settings screen information management unit 60 in step S36. In step S38, the screen configuration unit 22 changes the open circle representing the displayed settings screen 1000 corresponding to the progress x to a large filled circle and changes the open circle on the left side of the large filled circle to the regular filled circle representing the settings screen 1000 that has been set.

As described above, according to the flowchart illustrated in FIG. 8B, the progress display area 1002 illustrated in FIGS. 5 to 7 describing the progress of the user's setting operation on the plurality of settings screens 1000 can be implemented.

Figure 9A:
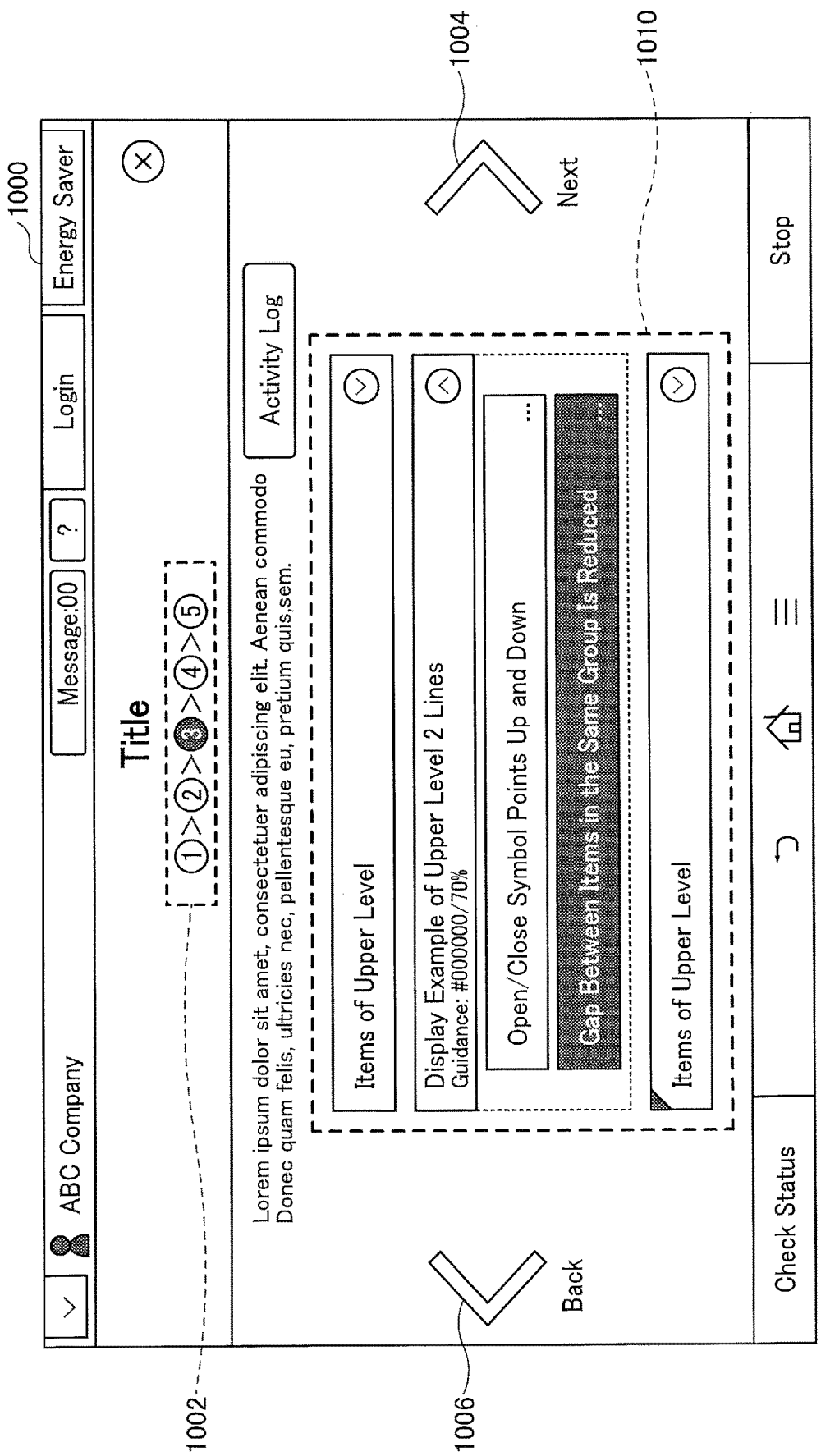
FIG. 9A and FIG. 9B are diagrams illustrating an example of a settings screen according to embodiments of the present disclosure.
Figure 9B:
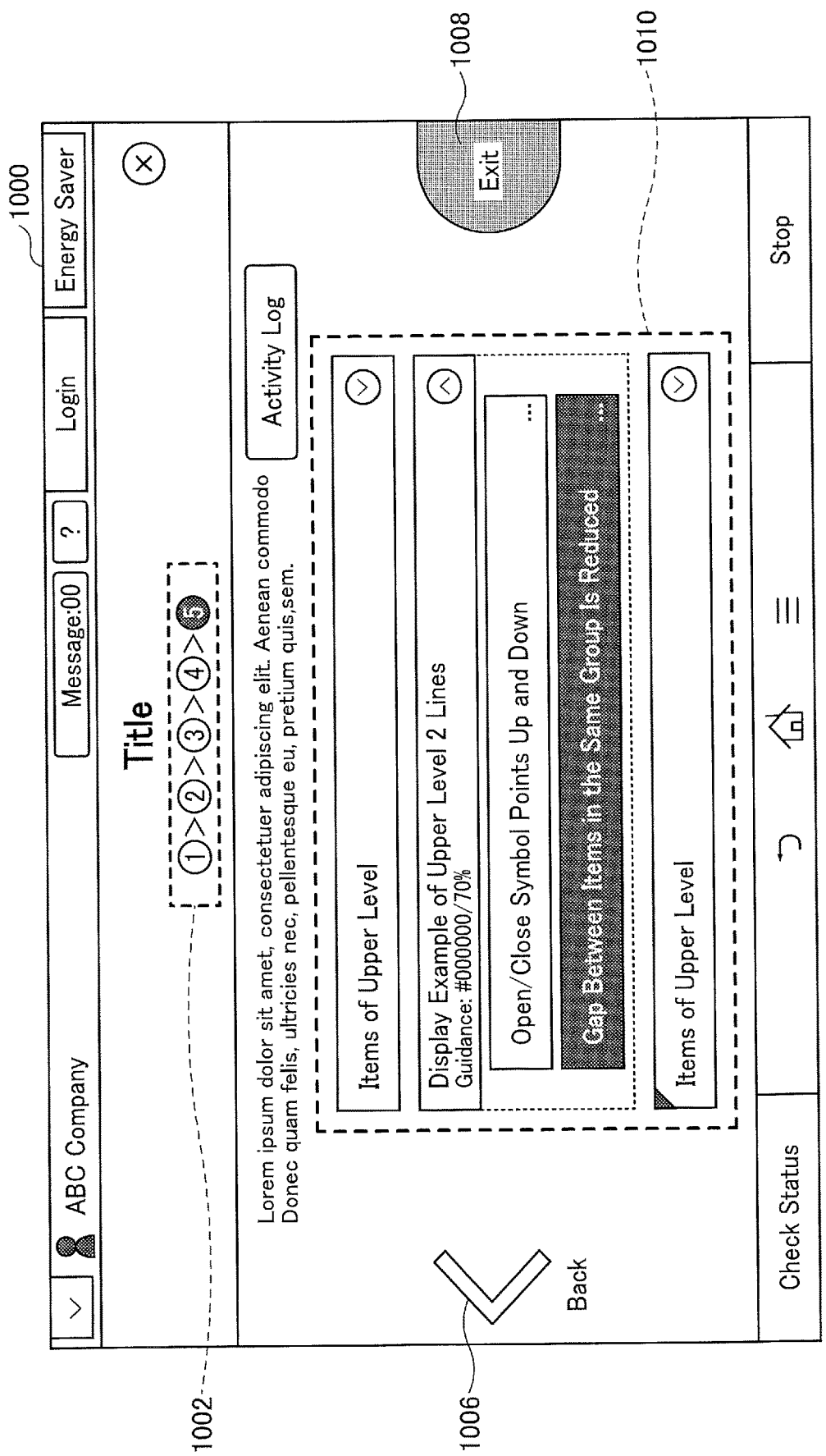

The progress display area 1002 illustrated in FIGS. 5 to 7 may be configured as illustrated in FIGS. 9A and 9B or FIGS. 10A and 10B. FIGS. 9A, 9B, 10A, and 10B are diagrams illustrating examples of the settings screens 1000 according to the present embodiment. In FIGS. 9A and 9B, page number is displayed in a circle representing each page of the settings screen 1000 in the progress display area 1002. The progress of the user's setting operation on the plurality of settings screens 1000 is displayed in an easy-to-understand manner.

Figure 10A:
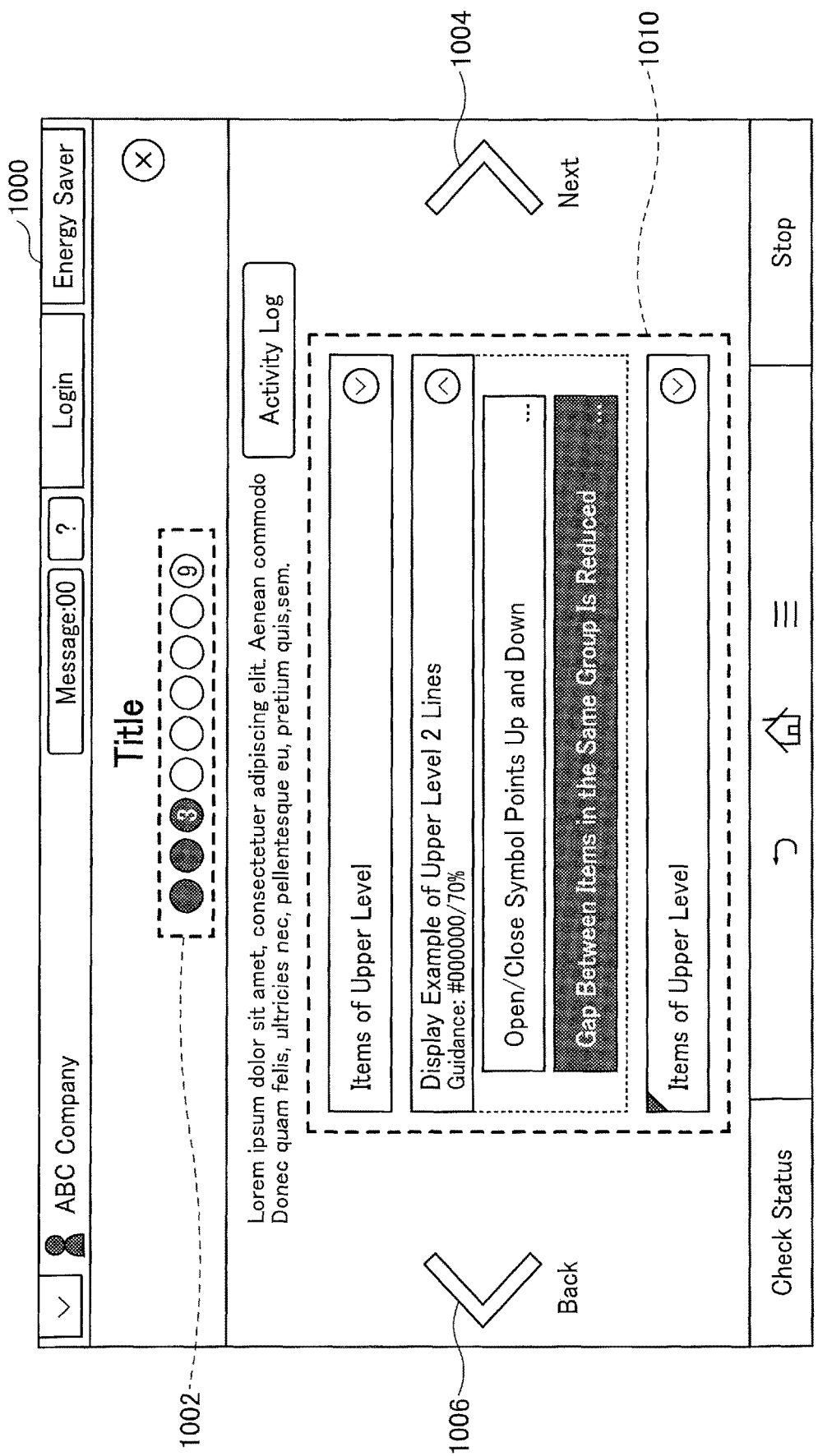
FIG. 10A and FIG. 10B are diagrams illustrating an example of a settings screen according to embodiments of the present disclosure.
Figure 10B:
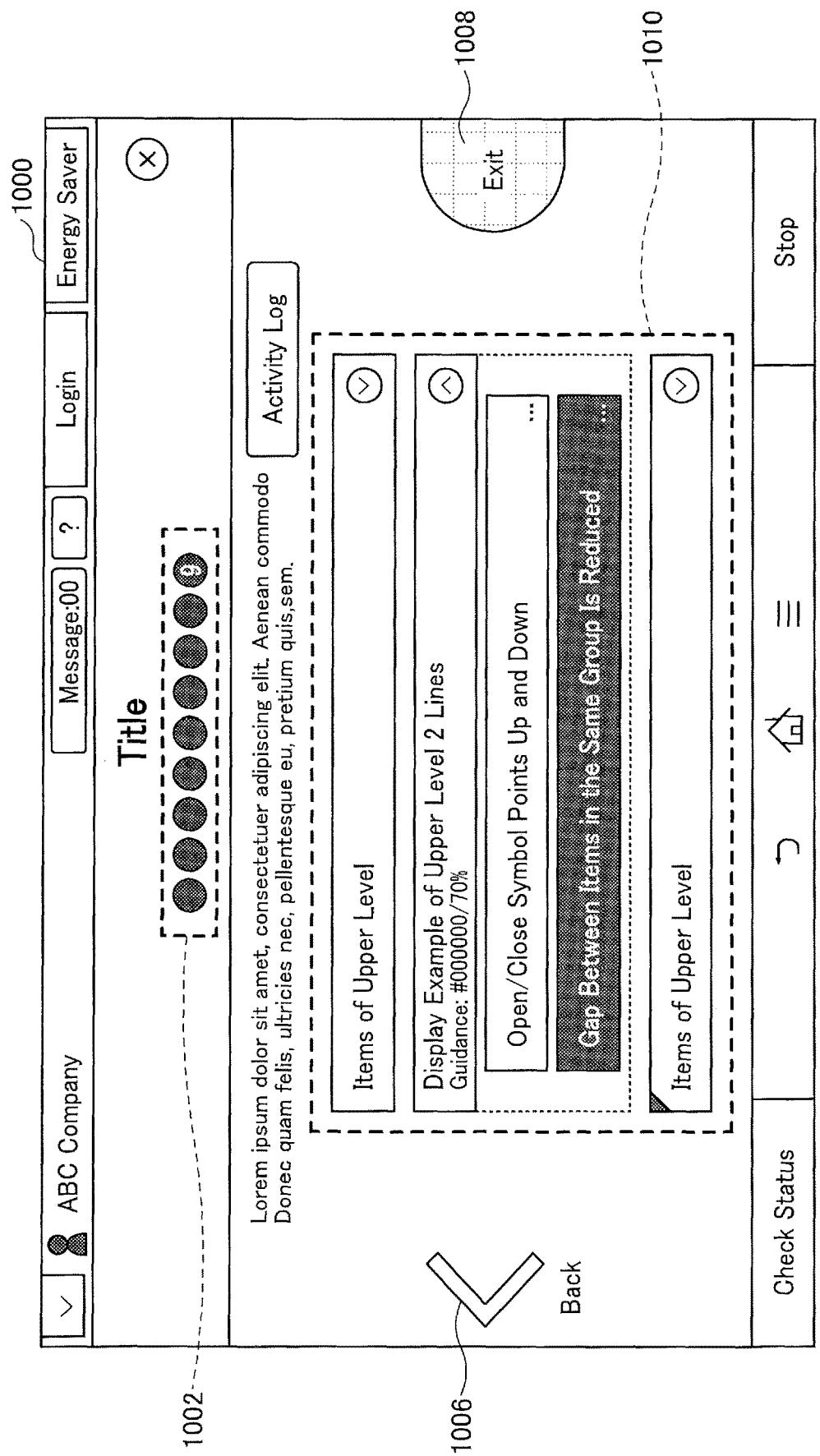

In order to make the progress of the user's setting operation on the plurality of settings screens 1000 easier to grasp, the progress display area 1002 illustrated in FIGS. 10A and 10B displays page number in the circle representing the page of the settings screen 1000 being displayed and the circle representing the last page of the settings screen 1000, among the circles representing each page of the settings screen 1000 in the progress display area 1002.

The screen configuration unit 22 may display the progress display area 1002 as illustrated in FIG. 9A and FIG. 9B when the number of settings screens 1000 (number of pages) is less than a preset number (for example, 5) and may switch the display as illustrated in the progress display area 1002 illustrated in FIGS. 5 to 7 or FIGS. 10A and 10B when the number is greater than or equal to the preset number. By performing such display switching, limited progress display area 1002 can be used effectively. In the case of the progress display area 1002 in FIGS. 5 to 7, when a circle is pressed by the user, detailed information on the page of the settings screen 1000 corresponding to the pressed circle may be displayed by a balloon or the like.

As described above, in the information processing system 1 according to the present embodiment, the display of the progress of the user's setting operation on the plurality of settings screens 1000 is easy to grasp by the user.

In the first embodiment, an example in which the user sets all the pages of the plurality of settings screens 1000 has been described. However, there may be a page that does not require confirmation, for example, when a default value is used. In a second embodiment, by pressing a circle in the progress display area 1002, it is possible to skip to the page of the settings screen 1000 corresponding to the circle.

Figure 11:
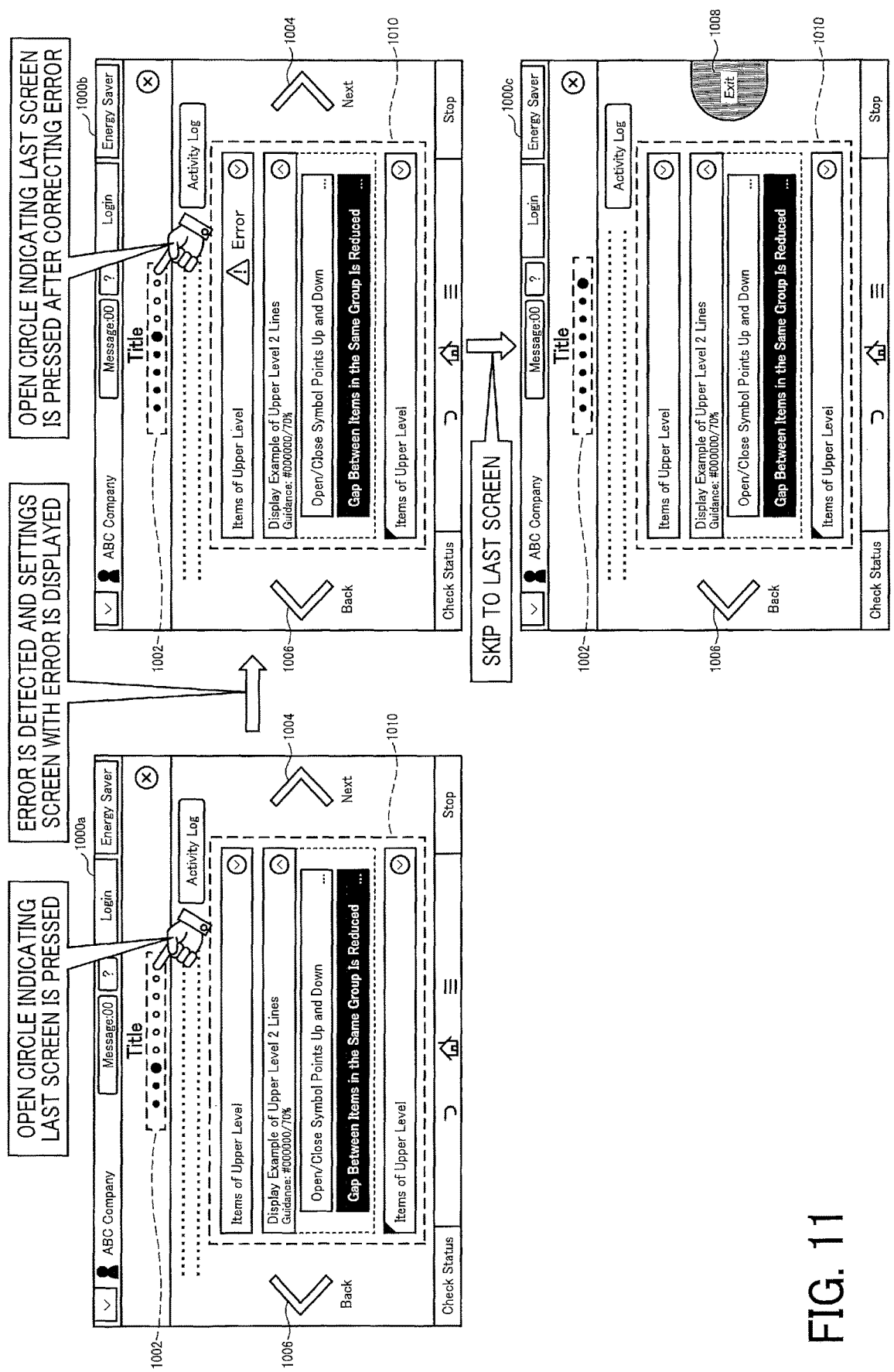
FIG. 11 is a screen transition diagram illustrating an example of a settings screen using a skip function.

FIG. 11 is a screen transition diagram of an example of the settings screen 1000 using a skip function. In the settings screen 1000a, it is assumed that the user has pressed the circle corresponding to the last page of the progress display area 1002. Here, it is assumed that a settings screen 1000b with error exists between the settings screen 1000a which is the third page being displayed and the settings screen 1000c which is the last page.

When executing the skip function, the screen configuration unit 22 determines the settings screen 1000 to be displayed depending on whether or not there is a settings screen 1000 with error or a settings screen 1000 requiring setting between the settings screen 1000a which is the third page being displayed and the settings screen 1000c which is the last page. In the example of FIG. 11, since there is the settings screen 1000b with error between the settings screen 1000a being displayed and the settings screen 1000c which is the last page, the settings screen 1000b with error is displayed instead of the settings screen 1000c which is the last page selected by the user.

If the settings screen 1000b with error does not exist between the settings screen 1000a being displayed and the settings screen 1000c which is the last page, the screen configuration unit 22 displays the settings screen 1000c which is the last page selected by the user. By correcting the error in the settings screen 1000b and then pressing the circle corresponding to the last page, the user can display the settings screen 1000c which is the last page.

Note that a warning screen may be displayed before transition from the settings screen 1000a to the settings screen 1000b in FIG. 11. The screen configuration unit 22 may display the warning screen before displaying the settings screen 1000c which is the last page, when there is a settings screen 1000 with error or a settings screen 1000 requiring setting between the settings screen 1000a being displayed and the settings screen 1000c which is the last page. Further, the screen configuration unit 22 may not display the exit button 1008 until all the settings screens 1000 are selected in order to prevent setting mistakes.

Figure 12:
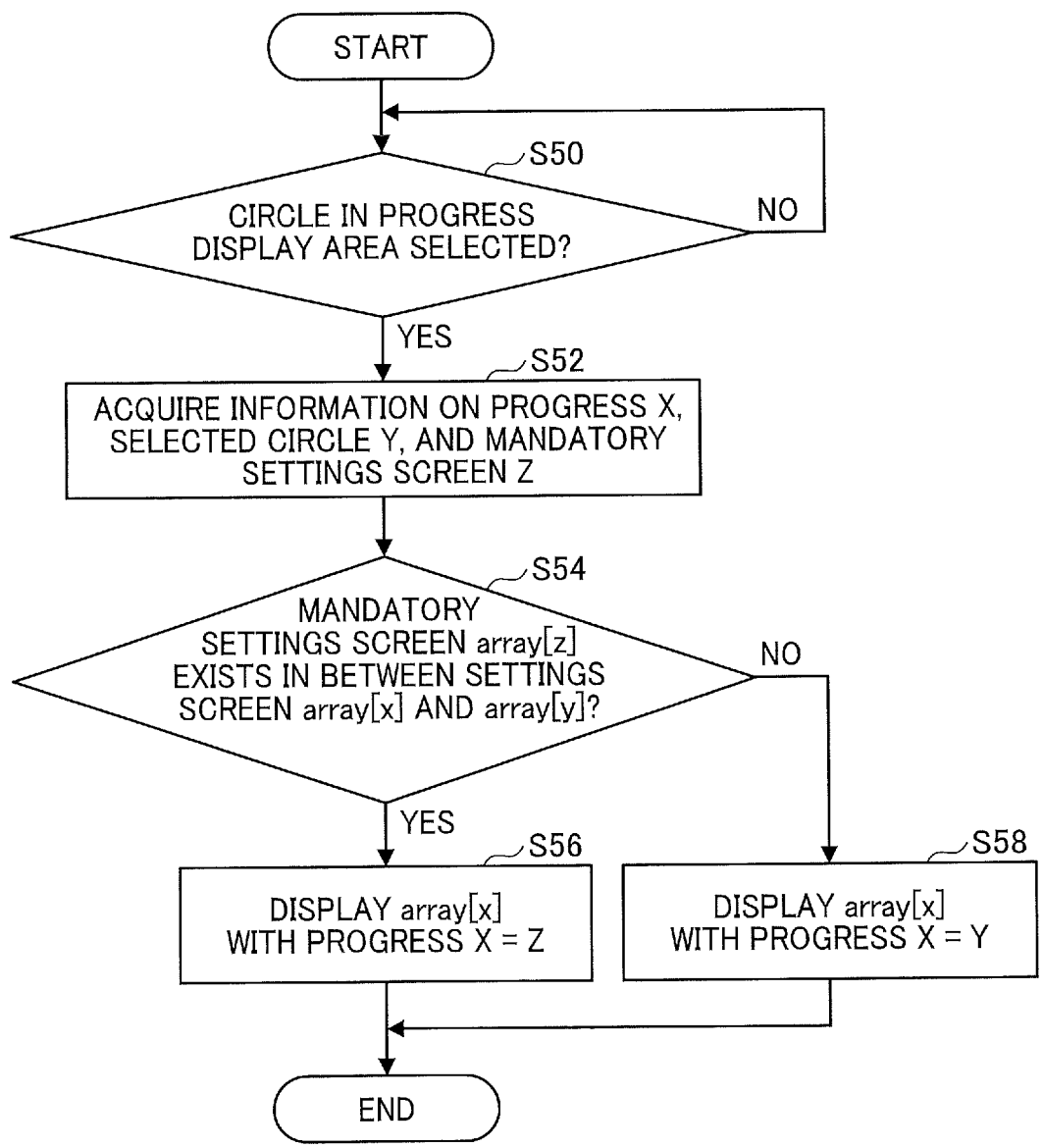
FIG. 12 is a flowchart illustrating an example of the skip function used in the settings screen according to embodiments of the present disclosure.

FIG. 12 is a flowchart describing an example of the skip function used in the settings screen 1000 according to the present embodiment. The flowchart illustrated in FIG. 12 describes an example in which the settings screen 1000 to be displayed is determined depending on whether or not the settings screen 1000 requiring setting exists.

When the user selects a circle in the progress display area 1002 in step S50, the screen configuration unit 22 acquires the progress x, a selected circle y, and a mandatory settings screen z that requires setting from the settings screen information management unit 60 in step S52. Progress x indicates the page number of the settings screen 1000 being displayed. The selected circle y indicates the page number of the settings screen 1000 designated by the user.

In step S54, the screen configuration unit 22 determines whether or not there is any mandatory settings screen z which is not set by the user between the page x of the settings screen 1000 being displayed and the page y of the settings screen 1000 selected by the user.

The screen configuration unit 22 proceeds to step S56 when there is any mandatory settings screen z which is not set by the user between the page x of the settings screen 1000 being displayed and the page y of the settings screen 1000 selected by the user. In step S56, the screen configuration unit 22 substitutes z, which is the page number of the mandatory settings screen z that must be set, for the progress x, and displays the page z of the settings screen 1000 which must be set.

On the other hand, when the mandatory settings screen z which must be set does not exist between the page x of the settings screen 1000 being displayed and the page y of the settings screen 1000 selected by the user, the screen configuration unit 22 proceeds to step S58. In step S58, the screen configuration unit 22 substitutes the progress x with the page y of the settings screen 1000 designated by the user and displays the page y of the settings screen 1000 selected by the user.

As described above, in the information processing system 1 according to the present embodiment, the skip function considering the error and the mandatory settings screen 1000 requiring setting can be implemented by pressing a symbol such as a circle in the progress display area 1002.

Figure 13:
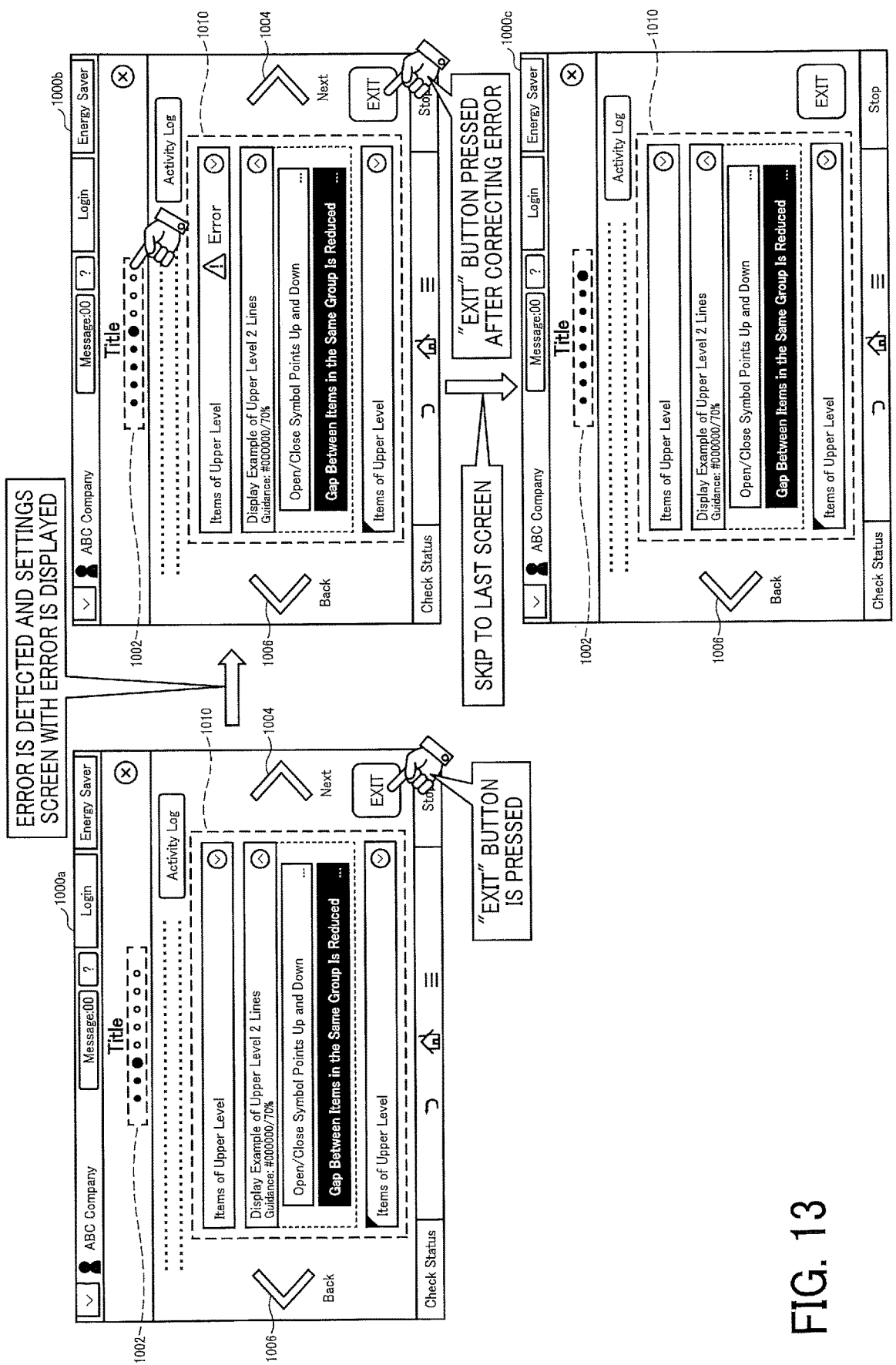
FIG. 13 is a screen transition diagram illustrating an example of the settings screen using the skip function.

In a third embodiment, the exit button 1008 is always displayed instead of only on the last page of the settings screen 1000. FIG. 13 is a screen transition diagram illustrating an example of the settings screen 1000 using the skip function.

Assume that the user presses the exit button 1008 in the progress display area 1002 on the settings screen 1000a. Here, it is assumed that a settings screen 1000b with error exists between the settings screen 1000a which is the third page being displayed and the settings screen 1000c which is the last page.

When the exit button 1008 is pressed, the screen configuration unit 22 determines the settings screen 1000 to be displayed depending on whether there is any mandatory settings screen 1000 which must be set or the like between the settings screen 1000a which is the third page being displayed and the settings screen 1000c which is the last page. In the example of FIG. 13, since there is a settings screen 1000b with error between the settings screen 1000a being displayed and the settings screen 1000c which is the last page, the settings screen 1000b with error is displayed instead of the settings screen 1000c which is the last page selected by pressing of the exit button 1008 by the user.

If the settings screen 1000b with error does not exist between the settings screen 1000a being displayed and the settings screen 1000c which is the last page, the screen configuration unit 22 displays the settings screen 1000c which is the last page selected by pressing of the exit button 1008 by the user. By correcting the error in the settings screen 1000b and pressing the exit button 1008, the user can display the settings screen 1000c which is the last page.

Note that a warning screen may be displayed before transition from the settings screen 1000a to the settings screen 1000b in FIG. 13. The screen configuration unit 22 may display the warning screen before displaying the settings screen 1000c which is the last page, when there is a settings screen 1000 with error or a settings screen 1000 requiring setting between the settings screen 1000a being displayed and the settings screen 1000c which is the last page.

Figure 14:
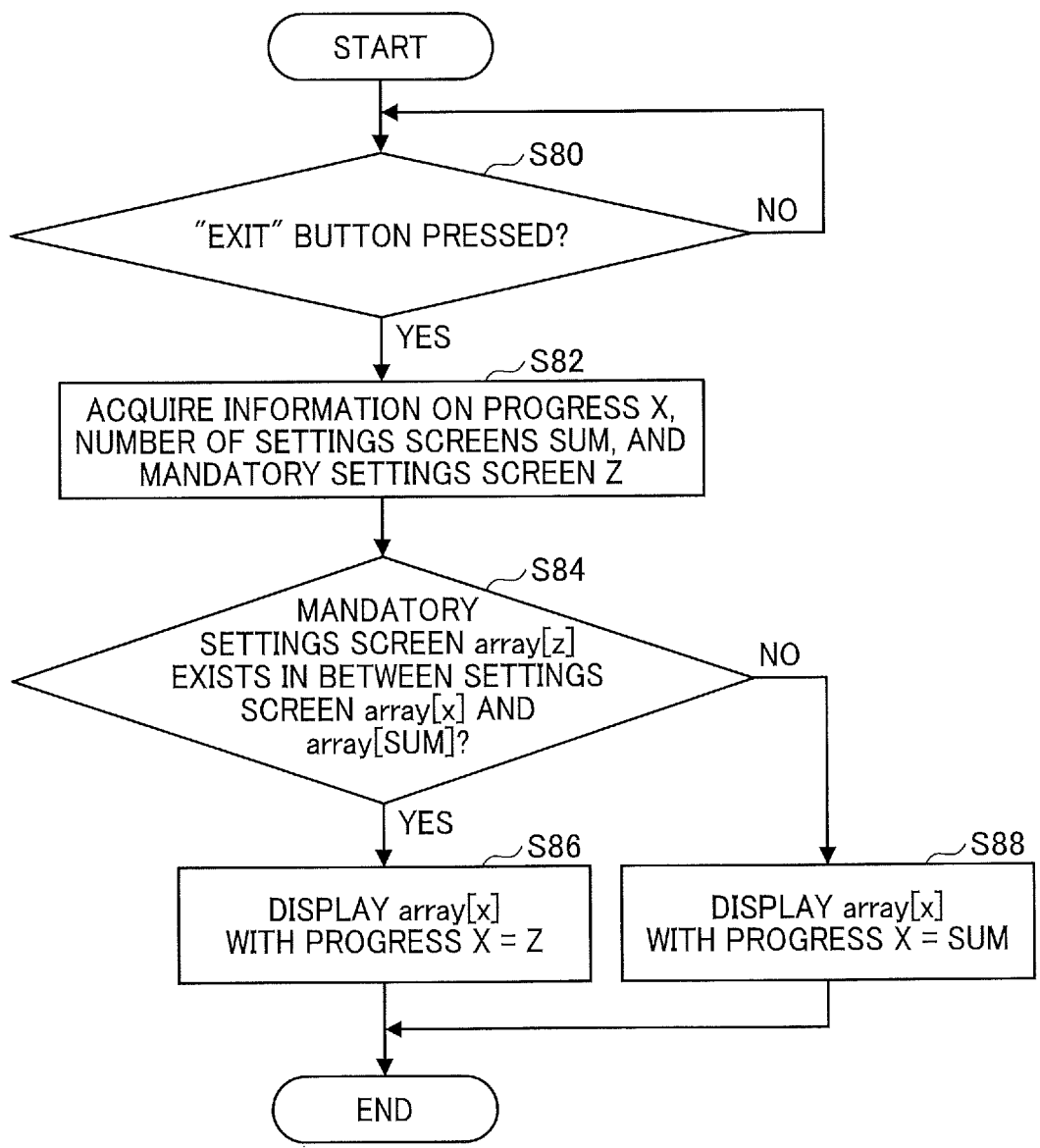
FIG. 14 is a flowchart illustrating an example of the skip function used in the settings screen according to embodiments of the present disclosure.

FIG. 14 is a flowchart illustrating an example of the skip function used in the settings screen 1000 according to the present embodiment. The flowchart illustrated in FIG. 14 describes an example in which the settings screen 1000 to be displayed is determined depending on whether or not the mandatory settings screen 1000 that must be set exists.

When the user presses the exit button 1008 in step S80, the screen configuration unit 22 acquires information on the progress x, the number of settings screens SUM, and the mandatory settings screen z requiring setting from the settings screen information management unit 60 in step S82. The progress x indicates the page number of the settings screen 1000 being displayed. The number of settings screens SUM indicates the page number of the last page of the settings screen 1000 selected by pressing of the exit button 1008 by the user.

In step S84, the screen configuration unit 22 determines whether or not there is any mandatory settings screen z that is not set by the user, between the page x of the settings screen 1000 being displayed and the last page SUM of the settings screen 1000 designated by the user pressing the exit button 1008.

The screen configuration unit 22 proceeds to step S86 when there is a settings screen z which is not set by the user between the page x of the settings screen 1000 being displayed and the last page SUM of the settings screen 1000 selected by pressing of the exit button 1008 by the user. In step S86, the screen configuration unit 22 substitutes z, which is the page number of the mandatory settings screen z that must be set, for the progress x, and displays the page z of the settings screen 1000 which must be set.

The screen configuration unit 22 proceeds to step S88 when the mandatory settings screen z requiring setting by the user does not exist between the page x of the settings screen 1000 being displayed and the last page SUM of the settings screen 1000 selected by pressing of the exit button 1008 by the user. In step S88, the screen configuration unit 22 substitutes the progress x with the last page SUM of the settings screen 1000 selected by the user and displays the last page of the settings screen 1000 selected by pressing of the exit button 1008 by the user.

As described above, in the information processing system 1 according to the present embodiment, the skip function that takes into account the settings screen 1000 with error or requiring setting is implemented by pressing the exit button 1008.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The next button 1004, the back button 1006, and the exit button 1008 are examples of one or more objects that receive a plurality of screen transition request operations in a sequential order from the user. The circle in the same number as the number of pages of the settings screen 1000 displayed in the progress display area 1002 is an example of a symbol representing degree of progress of a user operation on a plurality of screens.

The open circle, the filled circle, and the large filled circle displayed in the progress display area 1002 are examples of symbol display forms. The page number displayed in the circle is an example of a number according to a series of sequence. The back button 1006 is an example of a first object. The next button 1004 is an example of a second object. The exit button 1008 is an example of a third object.

What is claimed is:

1. An information processing terminal comprising:
circuitry configured to:
   display, on a display, a plurality of screens in a sequential order, one or more of the plurality of screens being configured to receive a user operation;
   display, on the display, a symbol indicating degree of progress of the user operation on the plurality of screens, and at least one object for receiving a screen transition request that requests transition from one screen to another screen of the plurality of screens in the sequential order; and
   change appearance of the symbol indicating the degree of progress of the user operation in response to the transition request,
   wherein the symbol indicating the degree of progress of the user's operation on the plurality of screens includes a plurality of symbols in the same number as the plurality of screens, the symbol having appearance that reflects the degree of progress,
   wherein the circuitry is further configured to:
   in response to receiving a selection of a particular symbol of the plurality of symbols in the same number as the plurality of screens, display on the display the screen corresponding to the particular symbol,
   wherein when the screen requiring setting exists in between the screen being displayed and the screen corresponding to the particular symbol, the circuitry is further configured to:
   display on the display warning information; and
   display on the display the screen requiring setting instead of the screen corresponding to the particular symbol.

2. The information processing terminal of claim 1, wherein
the plurality of symbols reflects a plurality of numerals arranged in the sequential order of the plurality of screens.

3. The information processing terminal of claim 1, wherein the circuitry is further configured to:
   display on the display one numeral of the plurality of numerals that indicating the screen being displayed and another numeral of the plurality of numerals indicating the last screen of the plurality of screens.

4. The information processing terminal of claim 1, wherein the circuitry is further configured to:
   display on the display a screen requiring setting instead of the screen corresponding to the particular symbol, based on a determination that a screen requiring setting exists in between the screen being displayed and the screen corresponding to the particular symbol.

5. The information processing terminal of claim 1, wherein the circuitry is further configured to:
   switch display of the symbol indicating the degree of progress of the user operation on the plurality of screens between a first display in which the symbol indicating the degree of progress includes a first plurality of symbols in the same number as the plurality of screens, the symbol having appearance that reflects the degree of progress, and a second display in which the symbol includes a second plurality of symbols arranged in the sequential order of the plurality of screens.

6. The information processing terminal of claim 1, wherein in response to selecting a particular symbol of the plurality of symbols in the same number as the plurality of screens for displaying the degree of progress of the user operation on the plurality of screens, the circuitry is further configured to:
   display on the display detailed information on the screen corresponding to the particular symbol.

7. The information processing terminal of claim 6, wherein the object includes:
   a first object for returning one of the screens displayed according to the sequential order;
   a second object for advancing one of the screens displayed according to the sequential order; and
   a third object for terminating reception of the user operation on the plurality of screens.

8. The information processing terminal of claim 7, wherein the circuitry is further configured to:
   transition to the last screen in response to receiving an operation on the third object displayed on the screen other than the last screen of the plurality of screens according to the sequential order.

9. The information processing terminal of claim 1, wherein the circuitry is further configured to:
   switch a type of the at least one object for receiving the screen transition request on the plurality of screens according to the sequential order of the plurality of screens to be displayed.

10. An information processing system comprising:
    an information processing terminal configured to display, on a display, a plurality of screens in a sequential order, one or more of the plurality of screens being configured to receive a user operation; and
    an information processing apparatus, wherein
    the information processing terminal including first circuitry configured to:
    receive an operation from a user;
    display, on the display, a symbol indicating degree of progress of the user operation on the plurality of screens, and at least one object for receiving a screen transition request that requests transition from one screen to another screen of the plurality of screens in the sequential order; and
    change appearance of the symbol indicating the degree of progress of the user operation in response to the transition request,
    the information processing apparatus including second circuitry configured to:
    execute at least a part of processing according to the user operation,
    wherein the symbol indicating the degree of progress of the user's operation on the plurality of screens includes a plurality of symbols in the same number as the plurality of screens, the symbol having appearance that reflects the degree of progress,
    wherein the circuitry is further configured to:
    in response to receiving a selection of a particular symbol of the plurality of symbols in the same number as the plurality of screens, display on the display the screen corresponding to the particular symbol,
    wherein when the screen requiring setting exists in between the screen being displayed and the screen corresponding to the particular symbol, the circuitry is further configured to:
    display on the display warning information; and
    display on the display the screen requiring setting instead of the screen corresponding to the particular symbol.

* * * * *